G. E. HARPHAM.
SHOCK ABSORBER.
APPLICATION FILED SEPT. 1, 1916. RENEWED APR. 2, 1921.

1,397,377.

Patented Nov. 15, 1921.

INVENTOR

UNITED STATES PATENT OFFICE.

GEORGE E. HARPHAM, OF LOS ANGELES, CALIFORNIA.

SHOCK-ABSORBER.

1,397,377.  Specification of Letters Patent.  Patented Nov. 15, 1921.

Application filed September 1, 1916, Serial No. 117,988. Renewed April 2, 1921. Serial No. 458,087.

*To all whom it may concern:*

Be it known that I, GEORGE E. HARPHAM, a citizen of the United States, residing at the city of Los Angeles, in the county of Los Angeles and State of California, have invented certain new and useful Improvements in Shock-Absorbers, of which the following is a specification.

My invention primarily relates to shock absorbers for vehicles having spring supported bodies such as carriages, automobiles and other like vehicles and the object thereof is to provide a simple and efficient device for preventing the objectionable rebound or recoil of the springs of such vehicles when passing over uneven surfaces.

In the drawings forming a part of this application:

Figures 1, 2:
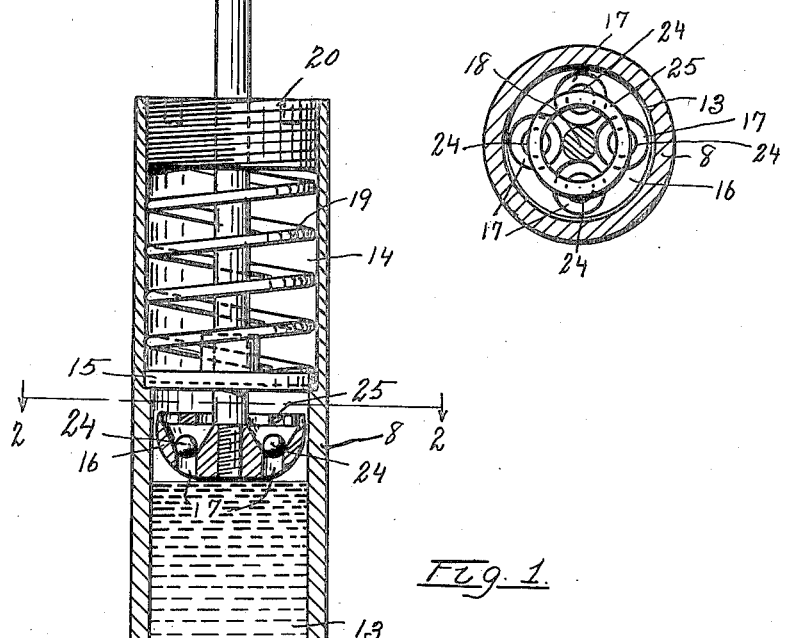
Figure 1 is a longitudinal central section of my improved shock absorber with parts of the vehicle to which it is attached.
Fig. 2 is a section on the line 2—2 of Fig. 1.

In the drawings 5 designates a portion of the body or chassis and 6 the axle of a vehicle which has the body carried or supported on the running gear by springs, not shown. My shock absorber comprises a metal cylinder 8 on the lower end of which is a shank or neck 9 which terminates in a head 10. A bracket 11 is secured upon axle 6. In the outer end of the bracket 11 is a socket 12 in which is received head 10 to make the connection between the cylinder and bracket a ball and socket joint. The lower portion of cylinder 8 is of less diameter than the upper portion and that portion will be denominated the liquid chamber 13. That portion above the liquid chamber will be denominated the spring chamber 14. The two chambers are separated by a floating piston or partition 15 which has a working fit in the spring chamber. A piston 16 having vertical funnel shaped ports 17 therein has a stem 18 which passes through the floating piston with a working fit and will be denominated the check valve piston. A rebound spring 19 rests upon piston 15 and surrounds stem 18. The upper end of the spring chamber is screw threaded and closed by a screw threaded plug 20 by means of which the tension of spring 19 may be regulated. Stem 18 passes through plug 20 with a working fit. The upper end of stem 18 terminates in a head 21 which is received in a socket 22 in bracket 23 bolted to the body 5, thereby making the connection between the stem and bracket a ball and socket joint. Balls 24 are held in the enlarged upper ends of ports 17 by a check ring 25.

In the operation of my shock absorber it is preferred to mount one of these cylinders at each spring of the vehicle and to fill the liquid chamber with a non-congealable liquid such as cylinder oil. When the vehicle passes over an uneven surface, the vehicle springs are compressed, the body and axle approach each other and the check valve piston moves toward the bottom of the liquid chamber and the liquid below the piston passes up through the check valves therein and also in the clearance space between the piston and the walls of chamber 13 as the piston descends. As soon as the springs of the vehicle, which are now under an undue compression, cause the separation of the body and axle the liquid between the pistons tends to prevent such separation and such separation takes place slowly as the liquid leaks back around the check valve piston. The leaking of the liquid around the piston is too slow for the medium and excessive shocks and a greater freedom of separation of body and axle is provided by the rebound spring which permits the floating piston to rise as the tension of the rebound spring is overcome.

By this construction it will be seen that a simple and efficient shock absorber is provided that prevents the vehicle springs from throwing the body beyond its normal position and restrains the violent separation of the body and axle after undue compression of the vehicle springs. My shock absorber may therefore be designated as composed of a dash pot with a spring pressed floating cover.

Having described my invention what I claim is:

1. A shock absorber comprising a cylinder; a floating piston having a working fit in the upper portion of said cylinder and having a central aperture therethrough; a check valve piston below said floating piston having a loose fit in the lower portion of said cylinder; check valves in said last piston; a stem secured thereto and extending upwardly through the floating piston to a point above the cylinder; a closure for the upper end of said cylinder; a rebound spring between said closure and said floating piston; means to secure said cylinder and stem of said check valve piston to the appropriate parts of the vehicle, and liquid in said cylinder below the floating piston.

2. A shock absorber comprising a cylinder having the lower portion formed into a liquid dash pot, said dash pot having a floating cover with a central aperture therein; an adjustable closure having a central aperture therein for the upper end of said cylinder; and a spring between said cover and said closure; means to connect said dash pot piston to the body of the vehicle; and means to connect said cylinder to the running gear.

In witness that I claim the foregoing I have hereunto subscribed my name this 2nd day of August, 1916.

GEORGE E. HARPHAM.